United States Patent [19]
Feldhaus et al.

[11] Patent Number: 5,579,880
[45] Date of Patent: Dec. 3, 1996

[54] FRICTION CLUTCH, IN PARTICULAR FOR MOTOR VEHICLES

[75] Inventors: Reinhard Feldhaus, Ebenhausen; Matthias Fischer, Eltingshausen; Joachim Lindner, Schweinfurt, all of Germany

[73] Assignee: Fichtel & Sachs AG, Schweinfurt, Germany

[21] Appl. No.: 276,844

[22] Filed: Jul. 18, 1994

[30] Foreign Application Priority Data

Jul. 19, 1993 [DE] Germany ............... 43 24 204.9
May 7, 1994 [DE] Germany ............... 44 16 264.2

[51] Int. Cl.$^6$ .................... F16D 13/64; F16D 3/14
[52] U.S. Cl. .................. 192/70.17; 192/214; 464/29; 464/68
[58] Field of Search ............... 192/70.17, 106.1, 192/106.2, 84 PM, 30 V, 207, 212, 213.3, 214, 84 A, 84 B, 84 C; 464/29, 68

[56] References Cited

U.S. PATENT DOCUMENTS

| | | | |
|---|---|---|---|
| 2,876,879 | 3/1959 | Maurice et al. | 192/84 A |
| 3,068,979 | 12/1962 | Arkus-Duntov | 192/70.17 X |
| 4,569,430 | 2/1986 | Raab et al. | 192/106.2 |
| 4,715,485 | 12/1987 | Rustin et al. | 192/106.2 |
| 5,236,186 | 8/1993 | Weltin et al. | |

FOREIGN PATENT DOCUMENTS

| | | |
|---|---|---|
| 0958270 | 2/1957 | Germany . |
| 2241531 | 3/1974 | Germany . |
| 3740570 | 6/1988 | Germany . |
| 3920588 | 1/1990 | Germany . |
| 4031762 | 4/1992 | Germany . |
| 4040592 | 6/1992 | Germany . |
| 0618243 | 7/1980 | Switzerland . |
| 0382905 | 11/1932 | United Kingdom . |
| 1555212 | 11/1979 | United Kingdom . |
| 2089000 | 6/1982 | United Kingdom . |
| 2248484 | 4/1992 | United Kingdom . |
| 8706667 | 11/1987 | WIPO . |

Primary Examiner—Richard W. Lorence
Attorney, Agent, or Firm—Nils H. Ljungman and Associates

[57] ABSTRACT

Friction clutch, in particular for motor vehicles, consisting of a driving portion as a counterpressure plate, a pressure plate oriented so that it can move axially but not rotationally with respect to the counterpressure plate, a clutch plate with clutch linings which can be fixed between the two and which is located non-rotationally on a drive shaft, whereby the clutch plate is provided if necessary with a load and/or idle damper, whereby there are also pressure elements for the clutch plate and/or the damper. On such a friction clutch, the object of the invention is to realize different, predetermined moments of friction with the identical geometry of the friction device. The invention teaches that this object can be achieved by providing as the pressure element at least one permanent magnet and/or at least one magnet system and/or at least one electrically energized magnetic circuit.

15 Claims, 5 Drawing Sheets

FRICTION CLUTCH, IN PARTICULAR FOR MOTOR VEHICLES

BACKGROUND OF THE INVENTION

1. Field of the Invention

The present invention generally relates to a friction clutch, in particular for motor vehicles, wherein such a clutch may typically include: a driving portion as counterpressure plate; a pressure plate oriented so that it can move axially but not rotationally with respect to the counterpressure plate; a clutch plate with clutch linings which can be fixed between the counterpressure plate and pressure plate, and which is located non-rotationally on a drive shaft. Typically, the clutch plate can be provided, if necessary, with a load and/or idle damper. Typically, there may also be pressure elements for the clutch plate and/or the dampers.

2. Background Information

Known (e.g. from German Laid Open Patent Application No. 40 31 762 and German Laid Open Patent Application No. 40 40 592) are friction clutches such as those described above, on which the clutch plates are provided with torsion damping devices, between a driving side and a driven side, to suppress torsional vibrations. These torsion damping devices can be designed as single-stage or multiple-stage devices, whereby each damping stage, as a rule, tends to be constituted by the parallel connection of a spring actuator (rigidity) with a friction device (damping). The friction devices are usually based on the principle of Coulomb friction (dry friction), i.e. the moment of friction is generated by means of the relative motion between a friction element and the driving side and/or the driven side of the clutch plate. The moment of friction tends largely to be independent of the relative velocity between the two bodies participating in the generation of the friction. The level of the moment of friction generated is not only generally a function of the coefficient of friction and the radius of friction, but also of the level of the contact force of the friction element against the friction partner. This force is conventionally generated by means of a spring actuator, e.g. by a plate spring or an annular spring. The level of the contact force is usually determined by the force-displacement characteristic and thus by the position in which the spring is installed. Thus, the level of the contact force also tends to be subject to the manufacturing tolerances of all of the components which define the installation space, as well as to the bending of the plate under the force of the spring. For this reason, it is generally only possible to realize a relatively broad range of tolerances for the moment of friction. In addition to generating the contact force for the friction device, the spring is also often used for the axial restraint, or bracing, of the driving side and the driven side of the clutch plate.

OBJECT OF THE INVENTION

The object of the present invention is to create a friction clutch by means of which different and predetermined moments of friction can be realized with the essentially identical geometry of the friction device.

SUMMARY OF THE INVENTION

The invention teaches that this object can be achieved by the use of at least one permanent magnet and/or at least one magnet system and/or at least one electrically energized magnetic circuit as the pressure element.

One advantage of this configuration is that the generation of the pressure force required for a friction device is preferably realized by means of a permanent magnet or a magnet system and/or a magnetic circuit. This principle offers several advantages, because the induction at the working point of the magnet can essentially be controlled by the degree of magnetization, and thus the moment of friction can essentially be set to the desired level. The moment of friction is also essentially independent of the space in which the friction device is installed, and is therefore essentially subject to only a few manufacturing tolerances, which means that the moment of friction can thus essentially be adjusted within significantly narrower limits.

An additional advantage is that the ability to realize different moments of friction by varying the pressure force for the friction device is essentially no longer limited by the need to use different springs (discontinuous graduations), but is achieved simply by means of different degrees of magnetization (which essentially means that a continuous adjustment is possible). The coordination/adjustment of moments of friction can therefore be carried out more rapidly and more economically.

An additional advantage is that as a result of the implementation of a control loop, such as a feedback control circuit, in the assembly of clutch plates, variances between the "measured moment of friction" and the "setpoint moment of friction" can be detected. These variances can be eliminated as necessary by means of a corresponding correction of the degree of magnetization of the magnet system. The effects of the manufacturing tolerances which occur in actual practice on the moment of friction can thus be limited, at least to a very great extent.

Additional configurations of the friction clutch discussed hereinabove are discussed hereinbelow.

Altogether different moments of friction can be realized using the identical geometry of the friction device or of the magnet system as a function of the permanent magnet material selected. This option makes it possible to achieve a modular system in which a friction device with different grades, or qualities, of magnetic material can be inserted, and can thereby exhibit different degrees of magnetization simultaneously.

There are various possibilities for the configuration and orientation of a magnetic friction device inside a clutch torsion damper. In principle, a magnetic friction device tends to include at least one friction element and the permanent magnet, and may also include a thrust collar which can have various purposes (to fix the friction element and/or magnet in the clutch plate, to prevent rotation with respect to the driving side or the driven side, to provide mechanical isolation/insulation, or to function as a magnetic flux concentrating piece in the magnetic circuit). One or more flux concentrating pieces made of soft magnetic material can also be advantageously integrated. The individual functions of several components can be combined into a single component, if necessary, e.g. the function of friction element and thrust collar can be so combined. The pressure element with its magnet can thereby be used to guarantee the correct axial position of the lining holder and the hub, and the bearing ring on the inside diameter of the lining holder can be used to guarantee the correct radial position. Naturally, it is also possible to locate the application element and magnet between the cover plate and the hub.

In summary, one aspect of the invention resides broadly in a friction clutch, such as for a transmission for a motor vehicle, the friction clutch comprising: a housing; a clutch disc disposed within the housing, the clutch disc defining an axis of rotation and an axial direction parallel to the axis of rotation; pressure plate means disposed within the housing and movable in the axial direction, the pressure plate means for applying an axial force to the clutch disc along the axial direction; biasing means for biasing the pressure plate means in the axial direction to apply the axial force to the clutch disc; the clutch disc comprising: at least one rotatable member being rotatably disposed for angular displacement about the axis of rotation; means for damping angular displacement of the at least one rotatable member; the damping means comprising means for providing a moment of friction to damp angular displacement of the at least one rotatable member; and the means for providing a moment of friction comprising at least one magnetic body for providing a magnetic force to magnetically engage the at least one rotatable member during angular displacement of the at least one rotatable member.

BRIEF DESCRIPTION OF THE DRAWINGS

Preferred embodiments of the invention are illustrated schematically in the accompanying drawings.

DESCRIPTION OF THE PREFERRED EMBODIMENTS

Figure 1A:
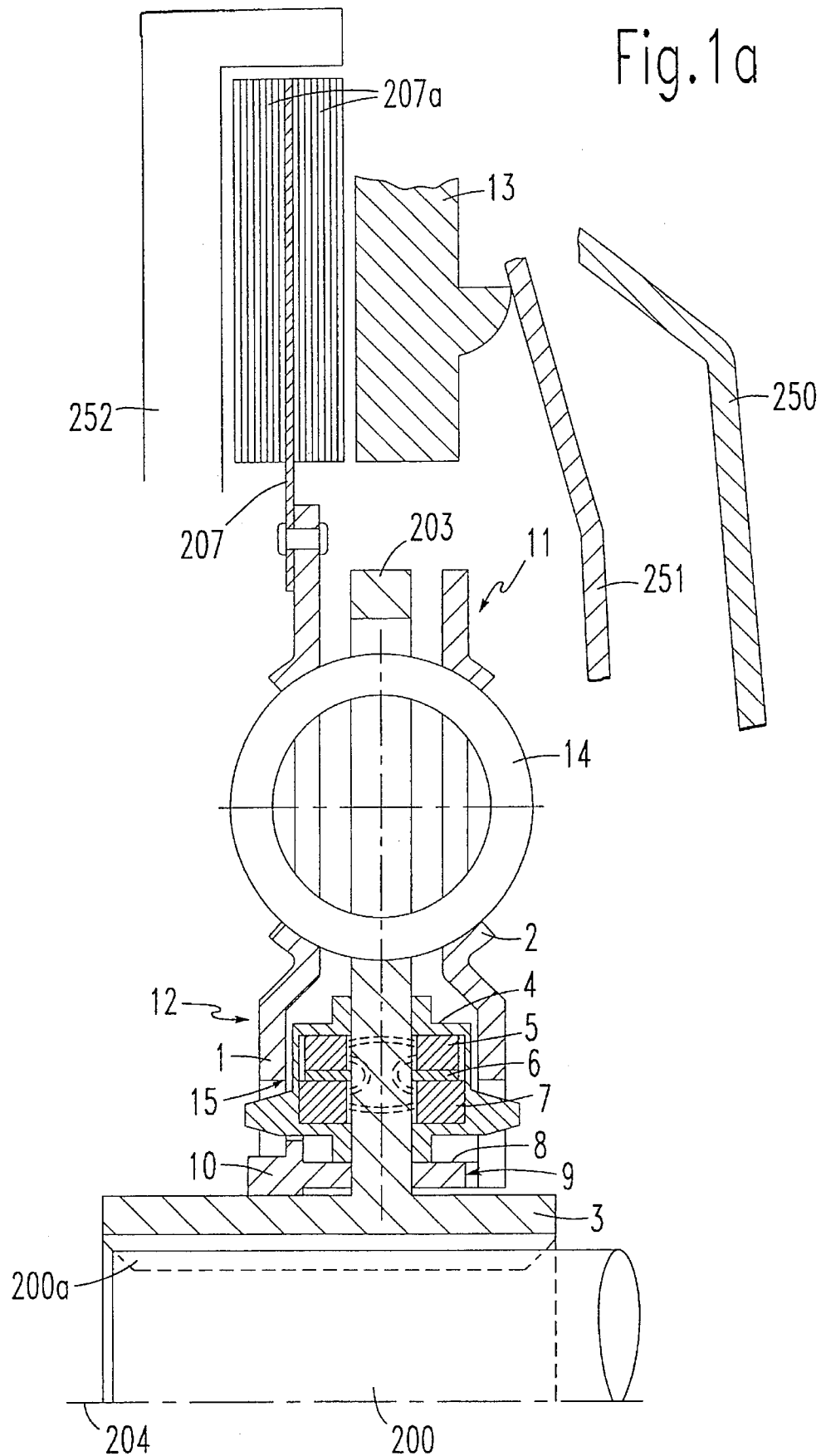
FIG 1a schematically illustrates several components of a clutch which may be employed in accordance with the embodiments of the present invention.

FIG. 1a generally illustrates a clutch arrangement having components of a clutch which may be employed in accordance with the embodiments of the present invention. Generally, clutch disc 11 may preferably have a hub 3 which can be configured to be mounted non-rotationally on a transmission shaft 200. This mounting can be provided, for example, by means of a toothing 200a, which toothing 200a would conceivably be configured to correspond to similar toothing on the transmission shaft 200. In general, the transmission shaft 200 defines an axis of rotation 204, about which the hub 3 rotates As shown in partial section in FIG. 1a, the clutch could preferably include a housing 250 for housing the components of the clutch therein. Hub 3 can preferably be provided with a hub disc 203, which hub disc 203 can be integral with the hub 3, and which hub disc 203 can point radially outward from the hub 3.

On either side of hub disc 203, what may be considered to be cover plates 1 and 2 can preferably be provided, which cover plates 1 and 2 can, in accordance with at least one embodiment of the present invention, be fixed in relation to one another and held at an axial distance in relation to one another. At least one of the cover plates 1 and 2, for example, the cover plate 1 as shown in FIG. 1a, can have, in its radially outer region, a lining support 207, to which friction linings 207a can be fastened, as shown in FIG. 1a.

Within housing 250, there may also preferably be a pressure plate device 13 for applying an axial force to the friction linings 207a to engage the linings 207a with a counterthrust plate, or counterpressure plate 252. This counterthrust/counterpressure plate 252 would essentially be rotating with the engine, and thus, the axial force applied by the pressure plate 13 would cause the hub disc 203 to also rotate with the engine and turn the shaft 200. The source for applying the axial pressure to the pressure plate 13 could preferably be embodied by a biasing member, such as a spring device 251, which can bias the pressure plate 13 away from the housing 250. Such arrangements of pressure plate 13, biasing member 251, housing 250 and counterthrust/counterpressure plate 252 are generally well-known to those of ordinary skill in the art, and are therefore only shown schematically in FIG. 1a.

Now turning to FIGS. 1b and 2–5, it will generally be understood that, in accordance with at least one embodiment of the present invention, the left-hand side of each of FIGS. 1b and 2–5 may generally be considered to be the "driving side" and that the right-hand side of each of FIGS. 1b and 2–5 may be considered to be the "driven side".

Figure 1B:
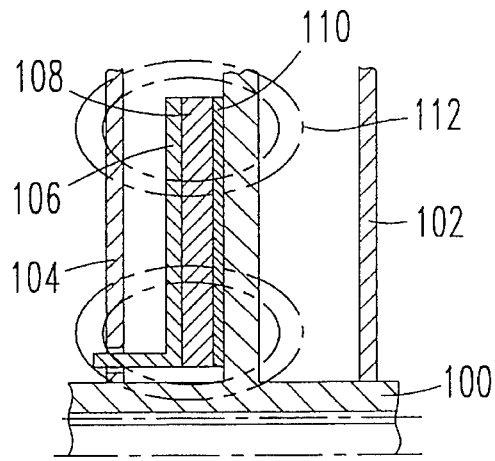
FIGS. 1b and 2–5, are diagrams of orientations of pressure elements.

FIG. 1b is a schematic illustration of a magnet system in which the moment of friction is preferably generated by means of a friction stage. The magnetic flux is preferably generated by means of the driven side, whereby the magnet is preferably non-rotationally connected to the driving side. The magnet system or the magnet can preferably be located inside or outside the clutch torsion damper. The magnet force is thereby used essentially exclusively to generate a moment of friction.

Figure 2:
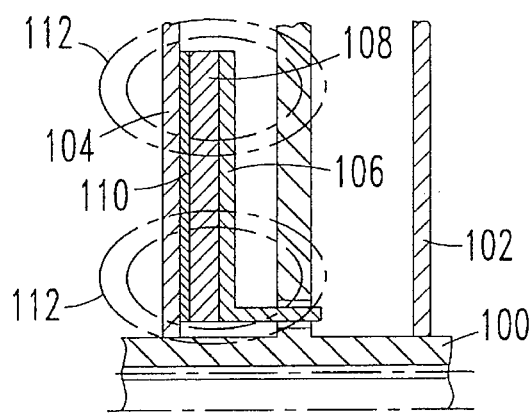

FIG. 2 also illustrates a magnet system in which the moment of friction is preferably generated with a single friction stage, whereby the magnetic flux is generated by means of the driving side. In this embodiment, the magnet is preferably non-rotationally connected to the driven side.

Figure 3:
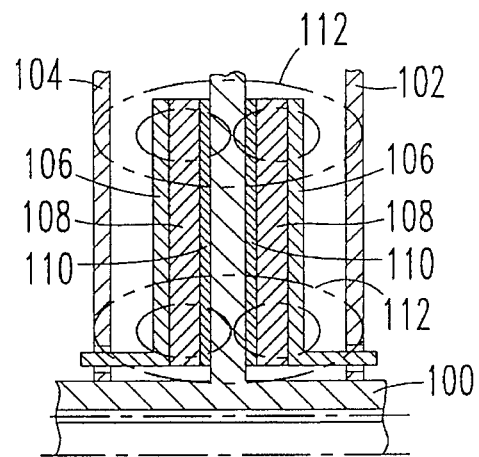

FIG. 3 is a schematic illustration in which several magnet systems preferably participate in the generation of the moment of friction of the friction stage. In this embodiment, the magnetic flux is preferably generated by means of the driven side, while the magnet is preferably non-rotationally connected to the driving side.

Figure 4:
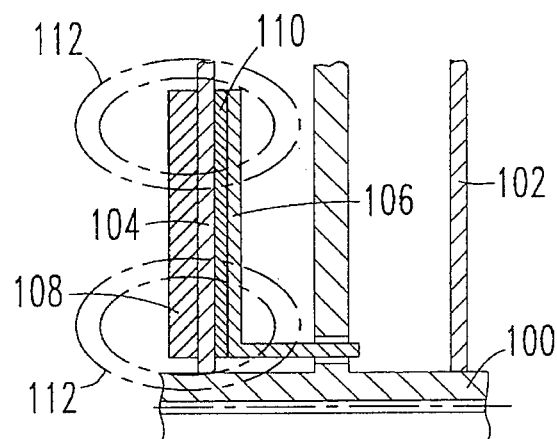

FIG. 4 also illustrates an embodiment which involves a magnet system, and in which the magnetic flux is preferably generated by means of the driving side, while the magnet is preferably non-rotationally connected to the driving side.

Figure 5:
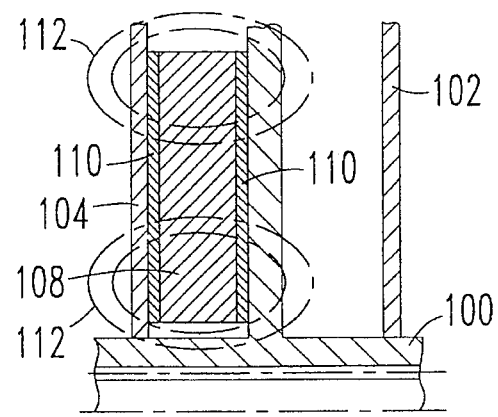

FIG. 5 illustrates a magnet system in which the magnetic flux is preferably generated by means of the driving and driven sides, in which case the magnet is preferably located so that it is free to rotate between the driving side and the driven side. In this case, the magnetic force can preferably be considered as not essentially being used exclusively to generate the moment of friction, but also to fix the driving side and the driven side of the clutch plate.

With general reference to FIGS. 1b and 2–5, it should be understood that, in accordance with at least one embodiment of the present invention, the following components may be employed in the manner illustrated: hub 100, cover plate 102 on the "driving side", cover plate 104 on the "driven side", connecting member 106, magnet member 108, magnetization area and/or friction pad 110, flux lines 112.

Thus, in accordance with a preferred embodiment of the present invention, as illustrated in FIG. 1b, magnet 108, which may preferably be constituted by a permanent magnet, may preferably be non-rotatably connected, via connecting member 106, to the driving side. In accordance with at least one preferred embodiment of the present invention, connecting member 106 may preferably be so disposed as to provide connection with cover plate 104. As is generally also the case with the embodiments shown in FIGS. 2–5, flux lines 112 may preferably result from magnet 108.

Preferably, as is generally also the case with the embodiments shown in FIGS. 2–5, the area of magnetization indicated at 110 may itself, without the aid of friction pads, be adequate for providing the desired moment of friction. Additionally, as is generally also the case with the embodiments shown in FIGS. 2–5, optionally, there may conceivably be a friction pad included in the area indicated at 110, wherein the moment of friction provided by magnet 108 may be supplemented by such a friction pad. Further, whether or not there is a friction pad present, in accordance with at least one embodiment of the present invention, the magnet 108 may provide an attractive magnetic force in such a way as to result in physical contact of magnet 108 (with or without a friction pad) against hub 100 or either of the cover plates 102, 104. Such physical contact would then essentially result in physical friction, whereby magnet 108 (with or without a friction pad) would "drag" with respect to the member or members being contacted (i.e. hub 100, plate 102 or plate 104).

In any of the aforementioned cases, relative movement between magnet 108 and hub 100 will preferably result in the production of eddy currents, which, in accordance with at least one preferred embodiment of the present invention, would assist in providing the desired moment of friction. Such a phenomenon should generally be well-known to those of ordinary skill in the art, and will thus not be described in further detail herein.

FIG. 2 illustrates a system in which magnet 108 may preferably be non-rotatably connected to the driven side via connecting member 106. In accordance with at least one preferred embodiment of the present invention, connecting member 106 may preferably be so disposed as to provide connection with hub 100.

FIG. 3 illustrates a system in which two magnets 108 may preferably be provided. Respective connecting members 106 may preferably provide connection of magnets 108 with cover plates 100 and 102, respectively.

FIG. 4 illustrates an embodiment in which magnet 108 may preferably be connected to the driving side via connecting member 106.

FIG. 5 illustrates an embodiment in which magnet 108 can preferably be mounted so as to freely rotate between the driving side and the driven side.

Figure 6:
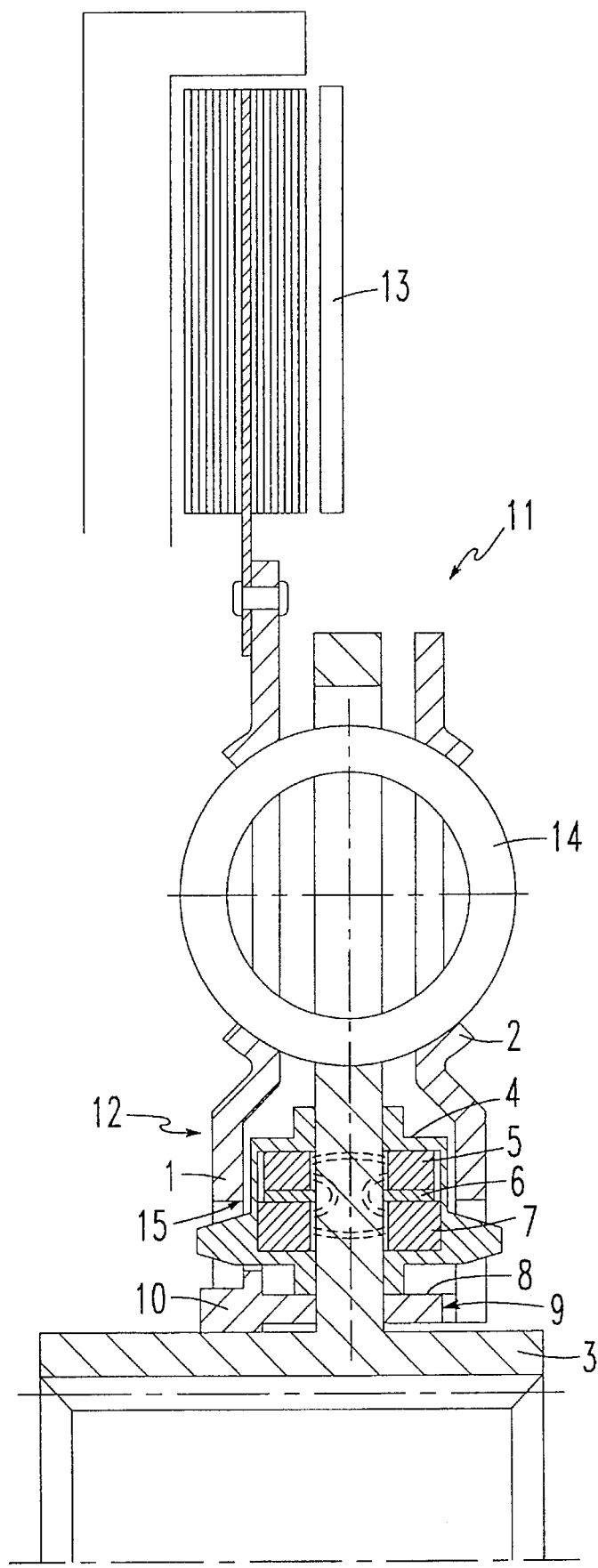
FIG. 6 illustrates one embodiment of a friction clutch with a magnetic pressure element in cross section.
Figure 7:
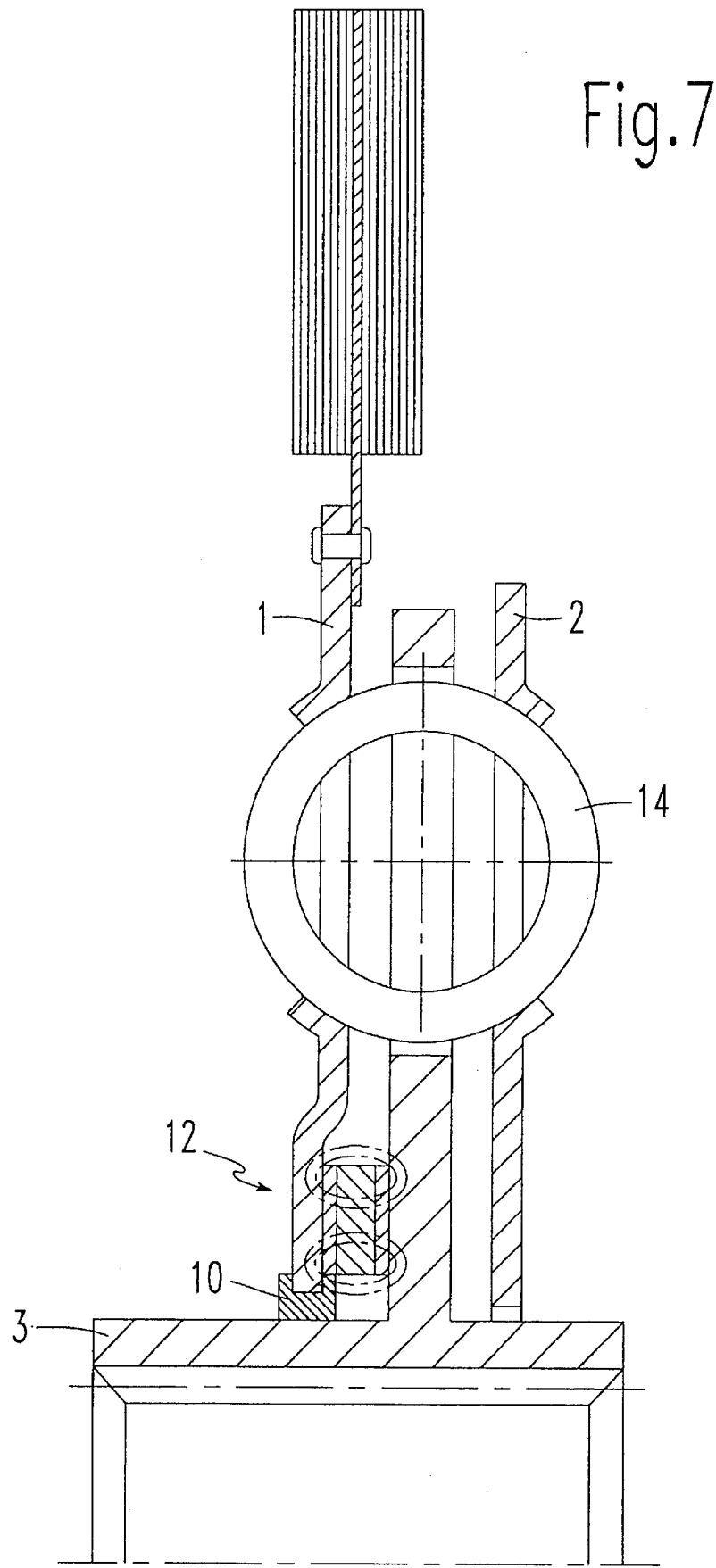
FIG. 7 illustrates one embodiment of a friction clutch as illustrated in FIG. 5.
Figure 8:
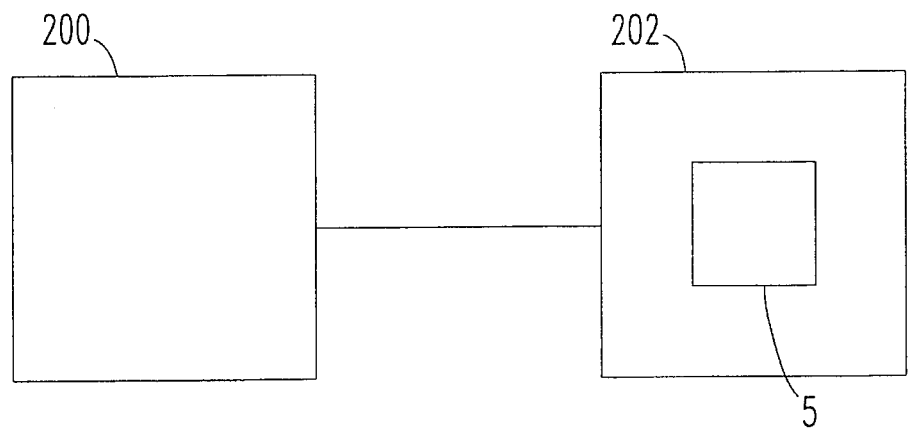
FIG. 8 schematically illustrates a general arrangement which may be utilized in accordance with the embodiments of the present invention.

It is to be understood that the components discussed above with relation to FIGS. 1b and 2–5 may, if appropriate, essentially be considered to be interchangeable with similar components discussed herebelow with relation to FIGS. 6–8.

It should be understood that, in accordance with at least one preferred embodiment of the present invention, the magnet force for generating a moment of friction could conceivably be assisted by friction pads.

In the respect of the embodiment illustrated in FIG. 5, FIG. 7 shows a concrete embodiment of the configuration which is illustrated schematically in FIG. 5. The lining holder 1 with its friction linings is preferably located on the one side of the hub 3, and the cover plate 2 is located on the opposite side. The two are preferably non-rotatably connected to one another and are preferably held at a distance from one another. The load damper 14 preferably has coil springs which are located in notches in the hub 3 and lining holder 1 or cover plate 2. In the radially inside area of the lining holder 1 and the hub 3, there is preferably a pressure element 12 with a magnet which acts as a damping element. When there is a rotation of the lining holder 1/cover plate 2 relative to the hub 3, a friction force is preferably generated as a function of the radius of friction, the coefficient of friction and the attractive force. At the same time, the lining holder 1 and the hub 3 are preferably in an axial position in which any manufacturing tolerances which may be present have no effect on the friction force. The bearing ring 10 also essentially guarantees a lower basic friction and a secure guidance of the plates 1 and 2 in relation to the hub 3.

FIG. 6 illustrates a concrete embodiment which is basically the same as the configuration illustrated in FIG. 3. In the embodiment illustrated in FIG. 6, two magnet systems are preferably used which are located on either side of the hub 3. The magnet systems preferably act on the hub 3 and are preferably non-rotationally connected to the driven plate assembly 1 or to the cover plate 2. The magnetic force is preferably used to generate the moment of friction, and on the driving and driven sides of the clutch plate, the spacer sleeve 8 and the annular spring 9 are braced slightly in relation to one another by means of the bearing ring 10. In accordance with at least one preferred embodiment of the present invention, spacer sleeve 8, via annular spring 9, can provide additional frictional engagement.

Since this arrangement is essentially intended only to fix the position of the hub between the plates, the basic friction which is generated here can be minimized through the use of plastic materials which have low coefficients of friction for the bearing ring and spacer sleeve, and a low spring force of the annular spring in the installed position, which simultaneously preferably has a flat spring characteristic.

As a result of the design of the magnet system as a closed magnetic circuit, the stray magnetic flux can preferably be small, i.e. the useful flux is essentially high in relation to the total flux. That results in magnetic forces which are essentially several times higher than those achieved in open systems, e.g. like those illustrated in FIGS. 1b and 2≧5. The magnet system in FIG. 6 preferably includes the annular magnet 5, the flux concentrating sleeve 7, the annular insulator 6 and the magnet cup 4. The individual parts are preferably pressed and/or glued to one another, and the annular magnet 5 is preferably in close contact, without any gap, against the guide sleeve. In other words, annular magnet 5 can preferably be disposed in close contact, in a gapless manner, against at least one of: cup 4, hub 3, annular insulator 6 and concentrating sleeve 7; and preferably against: cup 4, annular insulator 6 and concentrating sleeve 7.

The magnet cup 4 can preferably act simultaneously as an insulator for the magnetic circuit and as a friction element. The insulator can be made, for example, of polyamide with a high resistance to wear and with the desired composition to determine the coefficient of friction, and is, as shown, preferably secured against twisting or warping in the driven plate assembly 1 or the cover plate 2 by means of several lugs.

The magnetic flux is preferably guided by means of the magnet 5 and the flux concentrator sleeve 7 to the hub 3. All of the cross sections which participate in the conduction of the magnetic flux are preferably designed so that essentially no magnetic saturation of the material can occur. A large diversion of the magnetic flux through the air is thereby essentially avoided, and the distance in air which has to be bridged by the flux is essentially limited to the working clearance. The induction at the working point of the magnet and thus the moment of friction which can be generated is a function of the length of the air gap, which should therefore preferably be kept as small as possible. The design width of the gap is preferably equal to the conventional extent of wear of the friction device over the useful life of the clutch plate, i.e. it preferably becomes smaller over the useful life of the clutch plate. The working point of the magnet system thereby preferably moves toward the right on the demagnetization curve.

The working point of the friction device is preferably set after the assembly of the magnet system and before its installation in the clutch plate. This setting can be made, for example, by first completely magnetizing the magnetic circuit to saturation. It is then preferably stabilized, e.g. demagnetized by a certain percentage by heating it to above the operating temperature of the friction device, to prevent irreversible demagnetization on account of temperature factors to which it is exposed during operation. Following the stabilization, the device is preferably calibrated by demagnetization to the desired working point.

When a control loop is used in the assembly process of the clutch plate, the desired working point can be calculated and set individually by the deviation of the measured moment of friction from the setpoint moment of friction. Reversible temperature losses during operation of the friction device can preferably be compensated by means of a compensation element, such as a magnetic shunt circuit, with inverse temperature response connected in parallel to the operating clearance.

FIG. 8 illustrates an alternative arrangement for providing magnetic flux in order to provide a moment of friction. Particularly, a DC generator 200 may preferably be provided and may be connected to a coil 202 disposed about magnet 5. Conceivably, the DC generator 200 may be mounted stationarily on a side of clutch disc 11, such as on housing 250 (see FIG. 1a). DC generator 200, as such, may include a stationary permanent magnet. Conceivably, a pickup coil could be provided on hub 3 and, in response to displacement with respect to permanent magnet, could transmit current, possibly via diodes, to coil 202, to essentially provide an electromagnet. Other functionable arrangements, operating under similar principles, will be apparent to those of ordinary skill in the art and, as such, need not be discussed in detail herein.

Figure 9:
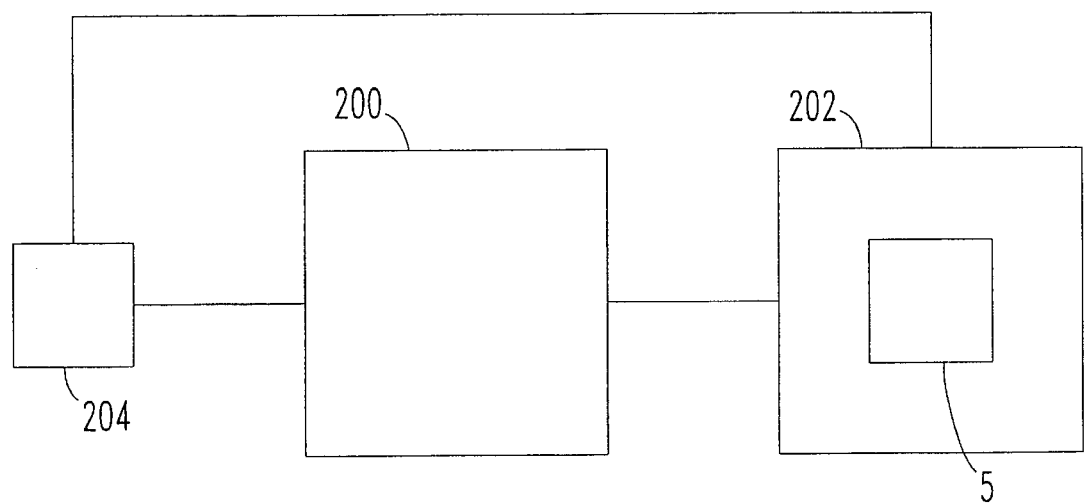
FIG. 9 illustrates essentially the same components as FIG. 8, but includes an additional component.

FIG. 9 illustrates that, in accordance with another embodiment of the present invention, a feedback control circuit 204 could be provided to adjust magnetization of magnet 5 based on any discrepancies between the preset moment of friction and the measured moment of friction. It is to be understood that such a control circuit 204 would include an appropriate device for measuring moment of friction or any other appropriate quantity.

Generally, it is to be understood that the terms "clutch plate" and "clutch disc", in accordance with at least one preferred embodiment of the present invention, may be considered to be interchangeable herein.

One feature of the invention resides broadly in the friction clutch, in particular for motor vehicles, consisting of a driving portion as counterpressure plate, a pressure plate oriented so that it can move axially but not rotationally with respect to the counterpressure plate, a clutch plate with clutch linings which can be fixed between the two and which is located non-rotationally on a drive shaft, whereby the clutch plate is provided if necessary with a load and/or idle damper, whereby there are also pressure elements for the clutch plate and/or the dampers, characterized by the fact that the pressure element 12 is at least one permanent magnet 5 and/or at least one magnet system and/or at least one electrically energized magnetic circuit.

Another feature of the invention resides broadly in the friction clutch, characterized by the fact that the pressure element 12 is located in the vicinity of the pressure plate 13.

Still another feature of the invention resides broadly in the friction clutch, characterized by the fact that at least one load damper 14 and/or one idle damper is pressurized by at least one pressure element 12.

Yet still another feature of the invention resides broadly in the friction clutch, characterized by the fact that the pressure force of the pressure element 12 can be generated by magnetizing one of the clutch elements made of magnetic material.

Still yet another feature of the invention resides broadly in the friction clutch, characterized by the fact that the pressure element 12 is provided with at least one flux concentrating piece made of soft magnetic material to influence the magnetic flux Another feature of the invention resides broadly in the friction clutch, characterized by the fact that a pressure element 12 is integrated in at least one of the clutch elements.

Still another feature of the invention resides broadly in the friction clutch, characterized by the fact that the pressure element 12 acts in the circumferential direction as a damping element.

Yet another feature of the invention resides broadly in the friction clutch, characterized by the fact that there is a pressure element 12 which is located between the hub 3 and preferably the lining holder 1.

Still yet another feature of the invention resides broadly in the friction clutch, characterized by the fact that the lining holder 1 is provided on its inside diameter with a bearing ring 10 and is mounted by means of the latter on the hub 3.

Examples of friction clutches, clutch discs and components associated therewith, which may be utilized in accordance with the embodiments of the present invention, may be found in the following U.S. Patents: U.S. Pat. No. 5,000,304 to Koch et al., entitled "Clutch Disc"; U.S. Pat. No. 4,941,558 to Schraut, entitled "Clutch Disc"; U.S. Pat. No. 4,854,438 to Weissenberger et al., entitled "Clutch Disc for a Friction Disc Clutch"; U.S. Pat. No. 4,741,423 to Hayen, entitled "Clutch Disc for a Friction Clutch"; and U.S. Pat. No. 4,715,485 to Rostin et al., entitled "Clutch Disc for a Motor Vehicle Friction Clutch".

Examples of magnetic circuits, DC generators and the like, including arrangements involving stationary magnets, which may be utilized in accordance with the embodiments of the present invention, may be found in the following U.S. Patents: U.S. Pat. No. 4,564,778, which issued to Yoshida on Jan. 14, 1986; U.S. Pat. No. 4,495,464, which issued to Kozai et al. on Jan. 22, 1985; U.S. Pat. No. 4,814,700, which issued to Krachanko on Mar. 21, 1989; U.S. Pat. No. 4,763,037, which issued to Hashimoto et al. on Aug. 9, 1988; and U.S. Pat. No. 5,172,046, which issued to Dittner et al. on Dec. 15, 1992.

Examples of feedback control circuits, which may be utilized in accordance with the embodiments of the present invention, may be found in the following U.S. Patents: U.S. Pat. No. 4,727,339, which issued to Doty et al. on Feb. 23, 1988; U.S. Pat. No. 4,447,783, which issued to Quick on May 8, 1984; U.S. Pat. No. 5,320,185, which issued to Foy et al. on Jun. 14, 1994; U.S. Pat. No. 5,303,308, which issued to Larsen et al. on Apr. 12, 1994; and U.S. Pat. No. 5,294,794, which issued to Davies on Mar. 15, 1994.

An example of an arrangement for concentrating magnetic flux, which may be utilized in accordance with the embodiments of the present invention, may be found in the following U.S. Pat. No. 5,164,921, which issued to Graff et al. on Nov. 17, 1992.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 24 204.9, filed on Jul. 19, 1993, and P 44 16 264.2, filed on May 7, 1994, both having inventors Reinhard Feldhaus, Matthias Fischer, and Joachim Lindner, and DE-OS P 43 24 204.9 and DE-OS P 44 16 264.2, and DE-PS P 43 24 204.9 and DE-pS P 44 16 264.2, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. Friction clutch for motor vehicles, said friction clutch comprising:

a driving portion as a counterpressure plate;

a pressure plate oriented so that it can move axially but not rotationally with respect to the counterpressure plate;

a clutch plate with clutch linings which can be fixed between the counterpressure plate and the pressure plate, which is located non-rotationally on a drive shaft;

at least one pressure element associated with at least a portion of the clutch plate;

at least one rotatable member;

the at least one pressure element comprising at least one solid magnetic body, for providing a magnetic force and for simultaneously contacting at least a portion of said at least one rotatable member;

the friction clutch comprising at least one of the following (A) and (B):
  (A) a load damper; and
  (B) an idle damper;

said at least one pressure element comprising means for applying a force to alter the damping provided by said at least one of (A) and (B);

said at least one rotatable member comprising at least one of:
  a hub; and
  a lining holder for holding the clutch linings;

at least one of the at least one pressure element is located between the hub and the lining holder;

the lining holder being provided on its inside diameter with a bearing ring; and the lining holder being mounted on the hub by means of the bearing ring.

2. The friction clutch according to claim 1, wherein said at least one solid magnetic body comprises at least one solid portion for contacting said at least a portion of said at least one rotatable member.

3. A friction clutch for a motor vehicle, said friction clutch comprising:

a housing;

a clutch disc disposed within said housing, said clutch disc defining an axis of rotation and an axial direction parallel to said axis of rotation;

pressure plate means disposed within said housing and movable in said axial direction, said pressure plate means for applying an axial force to at least a portion of said clutch disc along the axial direction;

biasing means for biasing said pressure plate means in the axial direction to apply said axial force to said at least a portion of said clutch disc;

said clutch disc comprising:

at least one rotatable member being rotatably disposed for angular displacement about said axis of rotation;

means for damping angular displacement of said at least one rotatable member;

said damping means comprising means for providing a moment of friction to damp angular displacement of said at least one rotatable member; and said means for providing a moment of friction comprising means for providing a magnetic force to magnetically engage at least a portion of said at least one rotatable member at least during angular displacement of said at least one rotatable member; and said means for providing a magnetic force comprising at least one solid magnetic body, said at least one solid magnetic body for providing a magnetic force to magnetically engage said at least a portion of said at least one rotatable member, and simultaneously contact said at least a portion of said at least one rotatable member, at least during angular displacement of said at least one rotatable member.

4. The friction clutch according to claim 3, wherein said at least one solid magnetic body comprises at least one solid portion for contacting said at least a portion of said at least one rotatable member.

5. The friction clutch according to claim 4, wherein:

said at least one rotatable member comprises a hub, said hub comprising means for engaging shaft means of a transmission;

said clutch disc further comprises:
  a hub disc disposed concentrically about and extending away from said hub, said hub disc being an integral extension of said hub, said hub disc having a first side and a second side;
  a first cover plate disposed adjacent said first side of said hub disc;
  a second cover plate disposed adjacent said second side of said hub disc;
  said hub and hub disc being displaceable, in a rotational direction, with respect to said first and second cover plates;

said at least a portion of said at least one rotatable member comprising said hub, such that said at least one magnetic body is configured for providing a magnetic force to magnetically engage at least said hub during angular displacement of at least said hub.

6. The friction clutch according to claim 5, wherein said means for providing a moment of friction is disposed generally in the vicinity of said pressure plate.

7. The friction clutch according to claim 5, wherein:

said damping means further comprises a plurality of biasing members disposed about said hub for torsionally damping rotational movement between said hub and said first and second cover plates; and said at least one magnetic body is configured for influencing the damping action of said plurality of biasing members.

8. The friction clutch according to claim 7, wherein:

said at least one magnetic body is further configured for providing a magnetic force to magnetically engage at least one of said first and second cover plates simultaneously with magnetically engaging said hub at least during relative angular displacement of at least said hub and said at least one of said first and second cover plates;

said hub comprising a magnetic material; and said at least one of said first and second cover plates comprising a magnetic material.

9. The friction clutch according to claim 8, wherein said at least one magnetic body is disposed solely at one of said first and second sides of said hub disc.

10. The friction clutch according to claim 9, wherein:

said at least one magnetic body is disposed solely at said first side of said hub disc;

said at least a portion of said clutch disc comprises friction linings and means for holding said friction linings;

said means for holding said friction linings being integrally connected to said first cover plate;

said plurality of biasing members comprising at least a portion of at least one
a load damper; and
an idle damper;

said at least one magnetic body is disposed substantially directly adjacent said hub disc and magnetically engages said hub disc and said first cover plate;

said at least one magnetic body is fixedly mounted with respect to said first cover plate;

said clutch disc further comprises a connecting member extending from, and fixedly mounted with respect to, said first cover plate;

said connecting member has a first portion, extending axially away from said first cover plate and axially towards said hub disc, and a second portion, extending radially away from said first portion and being oriented generally parallel to said hub disc and said first cover plate; and said at least one magnetic body is fixedly mounted on said second portion of said connecting member end faces towards said hub disc.

11. The friction clutch according to claim 9, wherein said at least one magnetic body is disposed substantially directly adjacent said one of said first end second cover plates and magnetically engages said hub disc and said one of said first and second cover plates.

12. The friction clutch according to claim 11, wherein:

said at least one magnetic body is disposed solely at said first side of said hub disc;

said at least a portion of said clutch disc comprises friction linings and means for holding said friction linings;

said means for holding said friction linings being integrally connected to said first cover plate;

said plurality of biasing members comprising at least a portion of at least one of:
a load damper; and
an idle damper;

said at least one magnetic body is fixedly mounted with respect to said hub disc;

said clutch disc further comprises a connecting member extending from, and fixedly mounted with respect to, said hub disc;

said connecting member has a first portion, extending axially away from said hub disc and axially towards said first cover plate, and a second portion, extending radially away from said first portion and being oriented generally parallel to said hub disc and said first cover plate; and said at least one magnetic body is fixedly mounted on said second portion of said connecting member and faces towards said first cover plate.

13. The friction clutch according to claim 11, wherein:

said at least one magnetic body is disposed solely at said first side of said hub disc;

said at least a portion of said clutch disc comprises friction linings and means for holding said friction linings;

said means for holding said friction linings being integrally connected to said first cover plate;

said plurality of biasing members comprising at least a portion of at least one of;
a load damper; and
an idle damper;

said at least one magnetic body is fixedly mounted on said first cover plate on a side of said first cover plate facing away from said hub disc;

said clutch disc further comprises a connecting member extending from, and fixedly mounted with respect to, said hub disc;

said connecting member has a first portion, extending axially away from said hub disc and axially towards said first cover plate, and a second portion, extending radially away from said first portion and being oriented generally parallel to said hub disc and said first cover plate; and said at least one magnetic body magnetically engages with said second portion of said connecting member.

14. The friction clutch according to claim 9, wherein:

said at least one magnetic body is disposed solely at said first side of said hub disc;

said at least a portion of said clutch disc comprises friction linings and means for holding said friction linings;

said means for holding said friction linings being integrally connected to said first cover plate;

said plurality of biasing members comprising at least a portion of at least one of:
a load damper; and
an idle damper;

said at least one magnetic body is interposed between, and disposed substantially directly adjacent both of, said hub disc and said first cover plate, and magnetically engages said hub disc and said first cover plate;

said at least one magnetic body is freely displaceable with respect to both said first cover plate and said hub disc;

said friction clutch further comprises a bearing ring;

said bearing ring being disposed directly adjacent to, and concentrically about, said hub; and said bearing ring being interposed between said first cover plate and said hub, to mount said first cover plate on said hub.

15. The friction clutch according to claim 8, wherein:

said at least one magnetic body comprises at least two magnetic bodies, a first of said at least two magnetic bodies being disposed at said first side of said hub disc and a second of said at least two magnetic bodies being disposed at said second side of said hub disc;

said first magnetic body is fixedly mounted with respect to said first cover plate;

said second magnetic body is fixedly mounted with respect to said second cover plate;

said clutch disc further comprises:
- a first connecting member extending from, and fixedly mounted with respect to, said first cover plate;
- a second connecting member extending from, and fixedly mounted with respect to, said second cover plate;
- a first flux concentrating piece; and
- a second flux concentrating piece;

said first connecting member has a first portion, extending axially away from said first cover plate and axially towards said hub disc, and a second portion, extending radially away from said first portion and being oriented generally parallel to said hub disc and said first cover plate;

said second connecting member has a first portion, extending axially away from said second cover plate and axially towards said hub disc, and a second portion, extending radially away from said first portion and being oriented generally parallel to said hub disc and said second cover plate;

said first magnetic body is fixedly mounted on said second portion of said first connecting member and faces towards said hub disc;

said second magnetic body is fixedly mounted on said second portion of said second connecting member and faces towards said hub disc;

said first flux concentrating piece directly surrounds said first magnetic body and directs the magnetic flux of said first magnetic body;

said second flux concentrating piece directly surrounds said second magnetic body and directs the magnetic flux of said second magnetic body;

said first flux concentrating piece is made of a soft magnetic material;

said second flux concentrating piece is made of a soft magnetic material;

said at least a portion of said clutch disc comprises friction linings and means for holding said friction linings;

said means for holding said friction linings being integrally connected to said first cover plate;

said plurality of biasing members comprising at least a portion of at least one of:
a load damper; and
an idle damper;

said friction clutch further comprises a bearing ring;

said bearing ring being disposed directly adjacent to, and concentrically about, said hub;

said bearing ring being interposed between said first cover plate and said hub, to mount said first cover plate on said hub.

\* \* \* \* \*

UNITED STATES PATENT AND TRADEMARK OFFICE
CERTIFICATE OF CORRECTION

PATENT NO. : 5,579,880
DATED : December 3, 1996
INVENTOR(S) : Reinhard FELDHAUS, Matthias FISCHER and Joachim LINDNER It is certified that error appears in the above-indentified patent and that said Letters Patent is hereby corrected as shown below:

In column 6, line 41, after 'and', delete "$2 \geq 5.$" and insert -- 2-5. --.

In column 11, line 37, Claim 10, after 'one' insert --of:--.

In column 11, line 56, Claim 10, after 'member', delete "end" and insert --and--.

In column 11, line 60, Claim 11, after 'first', delete "end" and insert --and--.

Signed and Sealed this

Twenty-ninth Day of April, 1997

Attest:

BRUCE LEHMAN

Attesting Officer

Commissioner of Patents and Trademarks